Patented Nov. 8, 1932

1,887,264

UNITED STATES PATENT OFFICE

JAMES B. GRENAGLE, OF BALTIMORE, MARYLAND, ASSIGNOR, BY MESNE ASSIGNMENTS, TO WILLIAM W. VARNEY, OF BALTIMORE, MARYLAND

PROCESS OF REDUCING ORES AND OBTAINING NEW PRODUCTS THEREOF, SEPARATING THE PRODUCTS AND THE PURIFICATION OF THE SEPARATED PRODUCTS

No Drawing.  Application filed August 20, 1929.  Serial No. 387,268.

The object of my invention is the providing of a simple process of decomposing the natural ores, separating the decomposed products and refining the separated products.

A further object of my invention is the decomposition of ores electrically.

A further object of my invention is the electrical separation assisted by a solvent of the binders in said ores heterogeneous to the metals desired to be recovered, thus rendering the same in a form to be further treated.

A further object of my invention is the treating of the ores so liberated of the binding materials thereof heterogeneous to the metals to be recovered, whereby various ores may be separated from each other by electrolytic action appropriate to the ores operated upon whereby the desired elements may be segregated.

A further object of my invention is the reduction of the segregated elements by an electric fusion, or bath, whereby the elements may be reduced to desired commercial form in the condition of purity desired.

A further object of my invention is the obtaining of a new product, or form of recovered metals.

With the foregoing and other objects in view, my invention consists of the methods employed, combination and arrangement of systems, apparatus and means as hereinafter specifically provided and set forth, wherein is shown the preferred embodiment of my invention, but it is understood that changes, variations and modifications may be resorted to which come within the scope of the claims hereunto appended.

In the ordinary process of the recovery of metals from ores, especially certain types of ores, such as, chromite, chrome iron ore, gold-bearing quartz, and many of the ores of hard, insoluble characteristics, I have discovered that I can disintegrate the ores without mechanical reduction, as is commonly done, by mixing the ores with such chemicals as will, under the influence of an electric current, produce a decomposition or unlocking of the ores desired, probably heterogeneous thereto, leaving the desired compounds in form to be treated; to be more specific, in the case of certain ores, dissolving or absorbing, or rendering the silica binding the same, or other binders, inactive or abstracting the same therefrom. This I will shortly illustrate by an example.

After the ores have been thus treated, while apparently in the same form, or shape, they are very easily reduced or knocked down into a mass comprising the compounds desired; whereupon after being thoroughly co-mingled in the dissolving solution, settle as a precipitate the heavier compounds going to the bottom first, or separating in layers according to the specific gravity of the previously bound together compounds. After the liquid is removed from the precipitate the various layers of the precipitated substance may be separated, thus separating the compounds into a more or less pure form, depending upon the care of separation, etc. These separated layers may be again treated in somewhat similar manner, if a greater degree of purity be desired. The compounds thus obtained from the various layers are dried and reduced in an electric furnace. If the layers are melted as dissolved from the first run a predominance in a higher percentage of the element of that layer will be obtained in the melt.

To more specifically illustrate my invention, I will describe in minutia the reduction of a chrome-bearing ore largely co-mingled with iron and probably bound together by silica, said ore containing many of the rarer metals and earth metals, the ore specifically used in this case carrying perhaps 30% of chromium, possibly 30% of iron, possibly 5% of yttrium, some gold, and possibly, some platinum and silica with possibly a small amount of alumina. These ores are varying, no two samples being alike, and I have simply generalized in this description for illustrative purposes.

This ore is very hard, dense, heavy and of dark appearance, running close to quartz, or when in contact with layers of quartz containing gold in the ore itself and in the quartz and others mixed. I give this simply, as suggested above to form a background for my operations.

The ore mentioned above I break into sizes suitable for my operating apparatus, preferably crushed and ground but large size may be used, using lumps ranging from 1 to 20 lbs. in weight. The apparatus used is a simple iron tank in which the ore is thrown in mixed with sodium-bi-sulphate, in the proportion of 1 lb. of the ore and 4 lbs. of sodium bisulphate (nitre cake, not refined) in aqueous solution. Introduced into the tank and the mass contained therein near the opposite sides of the tank, are two electrodes composed of preferably cast-iron of a high silicon content, being a very poor, hard quality of iron containing perhaps silica and other impurities. Electric terminals are attached to these electrodes and a direct current is permitted to flow between the terminals; in the case illustrated, the diameter of the container being 40 inches and the electrodes were about 6 inches from the container on either side. A current of 250 watts running as high as 400 amperes was permitted to flow between the terminals for such a length of time as was necessary to reduce the mass to a fluid containing a precipitate for a period ranging from 3 to 7 hours, the time depending upon surrounding conditions, the current being run sufficiently long to entirely disintegrate the mass. After precipitation, the liquid was siphoned off, and the layers of precipitate were scraped off, and the ore separated, the top layers containing probably a compound of yttrium content co-mingled with various other lighter compounds below which was chromium co-mingled with various elements of about its specific gravity, or forming imperfect precipitation. Below that came the heavier compounds of metal contents, gold, platinum, and other rare elements in compound in more or less impurity.

While in my experiments I resort to a simple method of precipitation depending upon the specific gravity of the various elements, in practise centrifugation may be used whereby the heavier elements may be separated from the lighter ones according to layer in much less time and probably in a purer form.

The fluid drawn off contained principally, iron in the major part, together with silica, and silicate of soda (sodium silicate) and other impurities.

The various strata of the precipitate may be re-treated with sodium bisulphate electrically as the original ore was treated, and re-precipitated for refining purposes. But for commercial purposes, I took these various layers of precipitate, washed them in water, dried them in a muffle and proceeded to melt the same in an electric furnace between terminals with a direct current, using an acid lining, whereby the mass became melted and was poured out into suitable containers.

Upon assay the chromium layer showed a varying component, but approaching 70% chromium, as illustrative of the purity of the various layers on the first run. Upon refining this run by smelting, substantially pure chromium was obtained.

The products of the metal thus obtained has lower melting temperature, of the same percentage of pure metal therein than any so far known.

When I use the term pure chromium or pure metals I mean substantially so as it may be owing to a trace, or barely a trace of an impurity producing in the applicant's opinion catalytic action in its reduction producing the lower melting point which impurities or their actions has previously been unrecognized in the ordinary methods of smelting owing probably to their destruction.

The products produced by my operation being of a lower melting point, of the same percentage of the metal involved in the case of high refractory metals alloying with lower refractory metals is a decided advantage, and in some cases imperative in an economical alloy.

I have discovered that the metals formed by this process assume a crystalline formation when slowly poured and in such form has the property of a lower melting point. In practise I have found that chromium substantially pure would melt at 2300° Fahrenheit or with a slight variation thereof, whereas the recognized melting point of chromium of the same purity is 2550° F.

Having thus described my invention, what I claim and desire to secure by Letters Patent is:

1. The reduction of metal bearing ores consisting of co-mingling therewith sodium-bi-sulphate, passing a current of electricity through the co-mingled mass for a sufficient time to substantially distintegrate the ore permitting a separation of the ore content then reducing the separated content.

2. The process of treating ore concentrates consisting of co-mingling therewith sodium bi-sulphate, energizing the co-mingled mass by passing an electric current through the same, then separating the precipitated content according to specific gravity of the various ingredients.

3. The process of recovering the compounds of metals of the chromium group from ores containing the same held together therein and locked with compounds of metals of other groups by gangue comprising treating said ore with sodium bisulphate in a fluid condition while passing a current of electricity therethrough, whereby compounds containing the chromium group of metals are released from the said ore and may be separated from the compounds containing said other elements.

JAMES B. GRENAGLE.